United States Patent Office 3,069,443
Patented Dec. 18, 1962

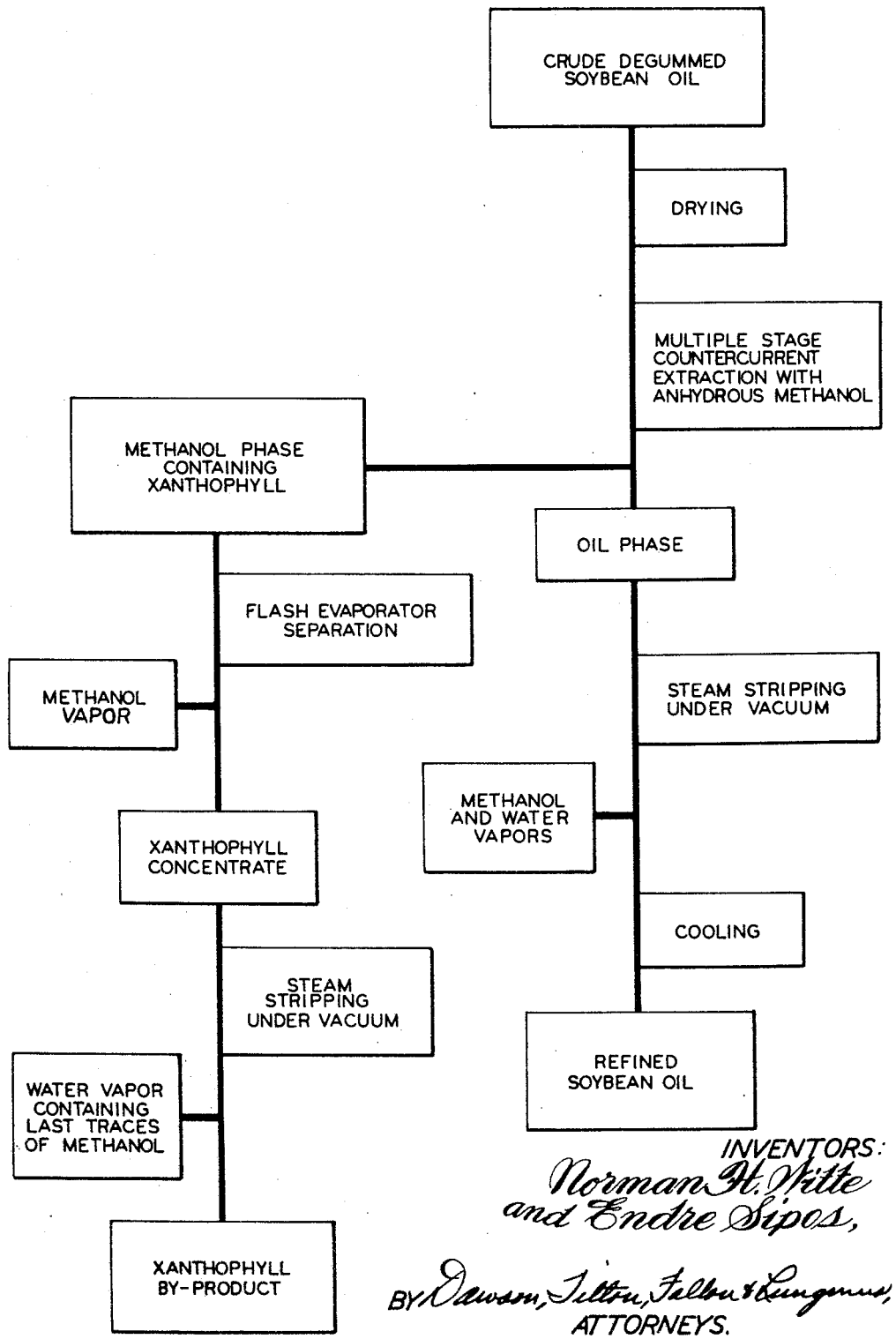

3,069,443
METHOD OF TREATING SOYBEAN OIL
Norman H. Witte and Endre Sipos, Decatur, Ind., assignors to Central Soya Company, Inc., Decatur, Ind., a corporation of Indiana
Filed Sept. 17, 1959, Ser. No. 840,718
4 Claims. (Cl. 260—428.5)

This invention relates to a method of treating soybean oil. More specifically, the method of this invention is adapted to improve the quality of the soybean oil while at the same time recovering a xanthophyll concentrate as a by-product. The xanthophyll concentrate thus obtained can then be mixed with animal feeds, particularly feed materials for poultry, for the purpose of providing a yellow pigmentation agent in the feeds, or the concentrate can be used as a yellow coloring agent for foods.

One of the objects of this invention is to provide an improved method of refining soybean oil and other vegetable oils. A further important object is to provide a method of recovering and concentrating the xanthophyll which is present in relatively minute or trace amounts in crude soybean oil. Another more comprehensive objective is to provide a method of improving the quality of soybean oil and at the same time recovering the xanthophyll in usable form. Further objects and advantages will appear as the specification proceeds.

The method of this invention in one of its embodiments is illustrated in the attached flow sheet. It is to be understood, however, that the method can involve variations from the processing steps illustrated in the flow sheet without departing from the essential procedures and conditions of the present invention, as described more fully hereinafter, and in the attached claims.

In practicing the method of this invention, it is preferred to start with a degummed soybean oil. The lecithin material which is normally present in substantial amounts in crude soybean oil is co-extracted with the xanthophyll which reduces the concentration of the xanthophyll extract. Consequently, it is preferred to remove most of the lecithin material from the soybean oil before it is subjected to the extraction procedure of the present invention. This can be accomplished by the conventional degumming procedure wherein the soybean oil is treated with water (or with live steam) to hydrate the lecithin-phosphatidic material, and the hydrated material is then separated by a suitable procedure such as centrifuging. Other methods can also be employed to reduce the lecithin content of the crude oils. When it is desired to recover the xanthophyll as a by-product, it is important that the degumming procedure be carried out in such a way that removal or destruction of the xanthophyll is largely avoided. Xanthophyll is sensitive to acidic mediums, and to prolonged heating at temperatures of 160–170° F. or above.

Crude soybean oil may contain from 2 to 6 percent of phosphatidic-lecithin material, which comprises most of the non-triglyceride material in the oil. Degummed soybean oil suitable for use in practicing the present invention will usually contain a total of less than 2 percent of non-triglyceride material and preferably less than 1 percent, these percentages being on a weight basis. On the other hand, the degumming treatment does not remove all of the non-triglyceride material, leaving the xanthophyll and other non-triglyceride compounds for subsequent removal. This is done in the alkali-refining, bleaching and deodorizing steps of present soybean oil refining processes. According to the method of the present invention, a refined soybean oil of acceptable flavor and color can be obtained without the need for a conventional alkali-refining step and with less severe bleaching conditions.

The degummed soybean oil suitable for practicing the present invention will usually contain at least 98 percent by weight triglyceride oil with the remainder comprising non-triglyceride components including the xanthophyll.

The crude degummed soybean oil is very likely to contain more water than can be tolerated in the process of this invention. It will therefore be important to control the moisture content of the degummed oil, and when the percentage of water therein is excessive, the oil should be subjected to a drying step. It is preferable to dry the oil to a substantially anhydrous condition. In practice the moisture content of the oil can be kept well below 0.3% by weight.

In the next and most basic step of the present process, the degummed soybean oil containing the xanthophyll is subjected to extraction with methanol under substantially anhydrous conditions. In this extraction, the xanthophyll collects in the methanol phase. Consequently, in the subsequent steps of the process, as will be explained in greater detail, the xanthophyll-containing methanol phase is separated from the oil phase, and the small proportion of methanol which is dissolved in the oil phase is removed therefrom to obtain the treated soybean oil.

As already indicated, the methanol extraction is preferably carried out under substantially anhydrous conditions. It is therefore desirable to control the moisture content not only of the soybean oil but also of the methanol. Preferably, the extracting solvent is practically anhydrous methanol. During the extraction, no part of the extraction system should contain in excess of 2 percent water, and preferably not in excess of 1 percent water by weight. The methanol phase will normally contain more water than the oil phase, the water being preferentially soluble in the methanol. Optimal results are obtained when the moisture content in the methanol phase is controlled to about .3 to .5 percent or less, and the oil phase has an even lower moisture content.

Where the degummed oil contains excessive moisture, as will normally be the case, it can be dried to a moisture content of as low as .1 percent by preheating it to a temperature of around 180° F., spraying the heated oil into the top of a column maintained under reduced pressure, and thereby flashing off the water. Methanol of suitably low water content can be obtained commercially. Commercial grades of methanol may contain around .3 percent water by weight. Since it will be desirable to recover and re-use the methanol, it will be desirable to provide distilling facilities, whereby the methanol after separation from the xanthophyll material and from the oil can be reduced to a very low moisture content.

The use of methanol in the extraction step is quite critical, since no other solvent has been found which will give equivalent results in cases where the maximum concentration of xanthophyll is desired in the extract. However, ethanol and other low molecular weight alcohols can be used when the primary object of the process is to produce a superior refined oil and lower xanthophyll concentrations in the extract can be tolerated. The extraction can be carried out in any suitable equipment, such as contact columns, centrifugal contactors, and with lesser advantage in a plurality of mixers and settlers. Preferably the methanol and oil are contacted countercurrently, and the extracting equipment is designed to provide a plurality of stages. When a multiple stage, countercurrent extraction procedure is followed and the oil and methanol phases are substantially free of water, the other process conditions are relatively noncritical. For example, solvent ratios of one to two parts by weight of alcohol per part of oil are satisfactory, although other solvent ratios can also be employed. The extraction temperatures may range from 40° F. or lower to 140° F. Good results are obtained at temperatures of around 125° to 130° F. At temperatures above 140° F. the mutual solubility of the oil and alcohol tends to become excessive, and of course the system must be operated below the boiling of methanol (about 156° F. at atmospheric pressure) unless pressure conditions are employed. At lower temperatures, the viscosity of the oil may increase to a point where good contact efficiency cannot be obtained.

According to the method of the present invention, the extraction can be carried out without chemical modification of the oil or xanthophyll. There is no need to employ auxiliary reagents. The presence of acidic materials or reagents which would effect the stability of the xanthophyll should be particularly avoided.

Although soybean oil contains a relatively minute amount of xanthophyll of the approximate order of 65 micrograms of xanthophyll per gram of oil, the method of this invention provides a means for obtaining the xanthophyll in a sufficiently concentrated form to permit it to be used as a pigmentation agent in poultry feeds or as a food color. Consequently, where the preparation of a xanthophyll concentrate is desired as a by-product of the oil refining procedure, the xanthophyll-containing methanol phase is separated from the purified oil, and subjected to further processing for the purpose of recovering the methanol while at the same time preparing the xanthophyll concentrate.

The methanol phase will contain a small percentage of triglyceride oil together with most of the xanthophyll and other non-triglyceride materials. If desired, part of the triglyceride oil can be removed from the methanol phase by reducing the temperature thereof to from 40 to 70° F., thereby forming a separate oil phase which can be removed by centrifuging, or by a settling and decanting procedure. Such a chilling procedure is not necessary, however, and in accordance with the preferred embodiment of the present invention, the oil in the methanol phase is carried through into the xanthophyll concentrate, thereby obtaining a product which can readily be mixed with poultry feeds. When some of the oil is removed from the methanol phase, there will be a further concentration of the xanthophyll in the final product, but even where the methanol phase contains from 1 to 2 percent of the total triglyceride oil of the starting material, xanthophyll concentrates containing at least 500 units of xanthophyll per gram of concentrate can be obtained. (1 unit of xanthophyll is equal to 1 microgram.)

In the processing of the methanol phase the methanol can be separated from the xanthophyll in oil by a suitable evaporation procedure, such as a flash evaporator separation. The resulting oil solution of xanthophyll (the xanthophyll concentrate) can then be subjected to steam stripping, preferably under vacuum to avoid destruction of the xanthophyll, for the purpose of removing the last traces of the methanol. The removal of the water and methanol vapors will yield a product comprising a xanthophyll concentrate which is non-toxic and in which the xanthophyll is sufficiently stable to permit the product to be stored for long period of time. As indicated above, this product is well adapted for mixing with poultry feeds. This product will consist of a soybean oil fraction (triglycerides, fatty acids, phosphatides, sterols, tocopherols, color bodies, etc.) containing at least 500 units of xanthophyll per gram of concentrate and will be substantially free of methanol.

Turning to the discussion of the procedure for refining the soybean oil, the oil phase after removing the methanol phase will contain a small percentage of dissolved methanol. For example, the oil phase may contain from 5 to 8 percent by weight of methanol. The methanol can then be removed by any suitable procedure, such as steam stripping under vacuum. The methanol and water vapors are removed, and the refined oil is thereafter preferably cooled before being stored or shipped. It is important that the methanol be completely removed from the oil to avoid any toxicity problem due to residual methanol.

The extraction of the oil with the methanol is preferably continued through three or more countercurrent extraction stages. By following the procedure described above and using a sufficient number of stages, it has been found possible to not only remove substantially all of the xanthophyll pigments but also to remove the other non-triglyceride components. For example, a degummed soybean oil containing from .3 to .5 percent by weight of non-triglycerides on an absolute loss basis at the start of the extraction treatment can have the percentage of non-triglycerides in the oil reduced to less than .1 percent by the refining procedure of this invention. In other words, the beany flavor in soybean oil and many of the pigments in the oil, which are normally removed in the bleaching and deodorizing steps of present processes, can be removed from the oil by the extraction procedure described herein. The process of this invention therefore results in an oil which can qualify as a refined soybean oil, and which can be sold for consumption for some food uses without further processing. In using the process for producing a high grade refined oil, it is therefore preferred that the extraction be continued until the oil contains less than 0.1 percent of non-triglyceride material as determined by the A.O.C.S. absolute loss determination and break-free by the Gardner Heat-Break Test.

For certain uses, it may be desirable to subject the oil to a mild bleaching treatment. Even where a further bleaching treatment is desired, the methanol extraction method of this invention has a definite advantage over conventional refining procedures, such as the widely used alkali refining method. It has been discovered that the methanol refined oil requires less of the bleaching reagent to obtain the same degree of color improvement. This provides a considerable saving in the cost of the bleaching material, such as the activated fuller's earths of which the A.O.C.S. Activated Bleaching Earths is one. By using as little as 2 percent of an A.O.C.S. Bleaching Earth, a final product can be obtained which will pass the A.O.C.S. Gardner-Acid-Heat-Break Test. This is the most stringent of the Gardner tests, and indicates that the undesirable materials have been entirely removed.

The preferred method of practicing this invention is further illustrated by the following example.

*Example*

Degummed soybean oil which is substantially free of lecithin-phosphatidic material is preheated to 180° F. and sprayed into the top of an evacuated column of flash off the water. In this drying operation, the water content of the oil is reduced to approximately 0.03% by weight. The dried oil contains about 0.5% by weight on an absolute loss basis of non-triglyceride material in addition to the small amount of water therein. The non-triglyceride material includes xanthophyll pigments in the amount of approximately 60 micrograms per gram of oil. This oil is then subjected to a multiple stage countercurrent extraction with methanol containing about .3 percent water by volume. The extraction is carried out at a temperature of about 125 to 130° F. and at a solvent:oil ratio of about 1:1. The extraction is carried out in a contactor column of standard design, the extraction being continued until the oil phase contains less than .1 percent of non-triglyceride organic material.

The methanol phase which contains approximately 1 percent by volume triglyceride oil in addition to the extracted non-triglyceride material is separated from the oil phase, and subjected to further processing to prepare a xanthophyll concentrate. The methanol is stripped from the triglyceride and non-triglyceride materials under conditions which prevent destruction of the xanthophyll. Most of the solvent is removed by a flash evaporator separation under reduced pressure, and the residual methanol is removed by steam stripping under vacuum. The resulting xanthophyll concentrate contains about 2,600 micrograms of xanthophyll per gram of oil (an increase in concentration of about 50 times over that of the original oil). An analysis of the concentrate shows that it contains about 58 percent triglyceride, 25 percent free fatty acids, 13 percent acetone insoluble, and 4 percent of sterols, unsaponifiables, etc.

This concentrate can then be mixed with poultry feed rations which are deficient in xanthophyll pigments.

The small percentage (about 6 percent by weight) of the methanol in the oil phase is removed by steam stripping the oil under vacuum. The oil is then cooled to provide a refined soybean oil product which contains less than 0.1 percent non-triglyceride material as indicated by the absolute loss determination and the ability of the oil to pass the Gardner-Heat-Break Test, which is a modification of the Gardner-Acid-Heat-Break Test wherein no acid is used. Part of this oil was then treated with 2 percent of an A.O.C.S. Bleaching Earth. The oil subjected to the further bleaching treatment passed the A.O.C.S. Gardner-Acid-Heat Break Test.

On the basis of the foregoing example and description, it is believed that the attached flow sheet will be largely self-explanatory. The boxes centered on the vertical lines describe the materials being processed, while the boxes to the right of these lines describe the processing steps. The boxes on the horizontal line extending to the left describe the materials being removed at various points in the process. The starting material is the crude degummed soybean oil as indicated in the box at the top of the sheet, and the final products are the refined soybean oil and the xanthophyll by-product as indicated in the boxes at the bottom of the flow sheet.

While the refining procedure of this invention is particularly adapted for the treatment of soybean oil, it is contemplated that it can also be advantageously applied to other triglyceride vegetable oils. In treating other vegetable oils, it may be desirable to utilize the methanol extraction procedure described herein to improve the quality of the oil by removing non-triglyceride material therefrom even though it is not desirable or feasible to prepare a xanthophyll concentrate as a by-product.

While in the foregoing specification many procedural details have been set forth for purpose of illustration, it will be apparent to those skilled in the art that certain of the procedures and operating conditions described herein can be varied considerably without departing from the basic principles of this invention.

We claim:

1. The method of treating soybean oil to improve its quality and to recover a xanthophyll concentrate as a by-product, comprising extracting crude degummed soybean oil containing xanthophyll with methanol at a temperature above 40° F. up to about 140° F., the extraction system including said methanol and said soybean oil containing less than 1 percent water by weight during said extraction, continuing said extraction until at least a major portion of the xanthophyll has been extracted into the methanol phase while said methanol phase contains less than 2% by weight of the triglycerides of said soybean oil, separating the xanthophyll-containing methanol phase from the oil phase, removing the methanol from the extracted material in said methanol phase to obtain a xanthophyll concentrate, and also removing the methanol from the oil phase to obtain a soybean oil product of improved quality.

2. The method of treating soybean oil to improve its quality and to recover a xanthophyll concentrate as a by-product, comprising extracting xanthophyll-containing soybean oil with methanol at a temperature above 40° F. up to about 140° F., said soybean oil at the start of said extraction being substantially free of gums and containing at least 98 percent by weight of triglycerides and in excess of 0.1 percent of xanthophyll and other non-triglyceride organic material, the extraction system including said methanol and said soybean oil containing less than 1 percent water by weight during said extraction, continuing said extraction until the oil phase contains less than 0.1 percent of said non-triglyceride material and the methanol phase contains less than 2% of the triglycerides of said soybean oil together with the extracted xanthophyll, thereafter separating the said oil phase from the methanol phase containing the xanthophyll and other non-triglyceride material, removing the methanol from the extracted material in said methanol phase to obtain a xanthophyll concentrate, and also removing the methanol from the oil phase to obtain a soybean oil product of improved quality.

3. The method of treating soybean oil, comprising subjecting degummed soybean oil containing xanthophyll to a multiple stage countercurrent extraction with methanol at a temperature above 40° F. up to about 140° F., the extraction system including said methanol and said soybean oil during said extraction containing less than 1 percent water by weight, continuing the extraction until the methanol phase contains an appreciable amount of said xanthophyll together with less than 2% by weight of the triglycerides of said soybean oil, separating the xanthophyll-containing methanol phase from the oil phase, and removing the methanol from the extracted material in said methanol phase to obtain a xanthophyll concentrate, and also removing the methanol from the oil phase to obtain a soybean oil product of improved quality.

4. The method of treating soybean oil to improve its quality and to recover a xanthophyll concentrate as a by-product, comprising subjecting soybean oil to a multiple stage countercurrent extraction with methanol at a temperature above 40° F. up to about 140° F., said soybean oil at the start of said extraction being substantially free of gums and containing in excess of 0.1 percent by weight of xanthophyll and other non-triglyceride organic material including the xanthophyll therein but not over 1 percent of said non-triglyceride material, the extraction system including said methanol and said soybean oil during said extraction containing less than 1 percent water by weight, continuing said extraction until the oil phase contains less than 0.1 percent of said non-triglyceride material and the methanol phase contains less than 2% by weight of the triglycerides of said soybean oil together with the extracted xanthophyll, separating the xanthophyll and non-triglyceride-containing methanol phase from the oil phase, removing the methanol from the extracted material in said methanol phase to obtain a xanthophyll concentrate, and also removing the methanol from the oil phase to obtain a soybean oil product of improved quality.

References Cited in the file of this patent

UNITED STATES PATENTS

| | | |
|---|---|---|
| 2,357,881 | Dombrow | Sept. 12, 1944 |
| 2,841,495 | Stewart | July 1, 1958 |
| 2,924,525 | Kruse | Feb. 9, 1960 |

OTHER REFERENCES

Schertz: Jr. Agri. Research XXX, March 15, 1925, pages 575–577.